United States Patent
Alayad

(10) Patent No.: US 12,011,330 B1
(45) Date of Patent: Jun. 18, 2024

(54) LIGHT TRANSMISSIVE DENTAL MATRIX BAND AND METHOD OF USING THE SAME

(71) Applicant: KING SAUD UNIVERSITY, Riyadh (SA)

(72) Inventor: Abdullah Saeed Alayad, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 18/134,781

(22) Filed: Apr. 14, 2023

(51) Int. Cl.
  *A61C 13/15* (2006.01)
  *A61C 5/85* (2017.01)

(52) U.S. Cl.
  CPC .............. *A61C 19/003* (2013.01); *A61C 5/85* (2017.02)

(58) Field of Classification Search
  CPC ................ A61C 5/80; A61C 5/85; A61C 5/88
  See application file for complete search history.

(56) References Cited

U.S. PATENT DOCUMENTS

| | | |
|---|---|---|
| 4,704,087 A | 11/1987 | Dragan |
| 5,330,353 A | 7/1994 | Wavrin |
| 5,380,198 A | 1/1995 | Suhonen |
| 6,350,122 B1 | 2/2002 | Meyer |
| 2006/0084029 A1* | 4/2006 | Viscomi .................... A61C 5/85 433/40 |
| 2019/0388203 A1* | 12/2019 | McDonald ............... B05D 1/02 |

FOREIGN PATENT DOCUMENTS

DE 102006005276 A1 8/2007

OTHER PUBLICATIONS

"ClearMetal Matrix," © Copyright 2014 Dentsply (N.Z.) Ltd.

* cited by examiner

*Primary Examiner* — Cris L. Rodriguez
*Assistant Examiner* — Sydney J Pulvidente
(74) *Attorney, Agent, or Firm* — Nath, Goldberg & Meyer; Richard C. Litman

(57) ABSTRACT

The light transmissive dental matrix band is a dental matrix band for use in combination with a photoreactive dental filling material. The light transmissive dental matrix band includes a plate having opposed upper and lower ends, with a vertical slot formed through the plate and extending from the upper end towards the lower end, with at least one horizontal slot formed through a central portion of the plate and in open communication with the vertical slot. A layer of optically transmissive material coats the upper end of the plate, and a volume of the optically transmissive material fills the vertical slot and the at least one horizontal slot. The volume of the optically transmissive material is in optical communication with the layer of optically transmissive material coated on the plate's upper end. A tab, for grasping by the dentist, may be secured to the upper end of the plate.

6 Claims, 5 Drawing Sheets

LIGHT TRANSMISSIVE DENTAL MATRIX BAND AND METHOD OF USING THE SAME

BACKGROUND

1. Field

The disclosure of the present patent application relates to dental treatments, and particularly to a light transmissive dental matrix band for use in combination with a photoreactive dental filling material during procedures for treating tooth decay.

2. Description of the Related Art

Dental caries, also referred to as tooth decay, are permanently damaged structures of the tooth that are typically caused by plaque, bacteria, excessive sugar consumption, improper or inadequate oral hygiene, and the like. Cavities caused by the tooth decay/caries often require treatment by restoration of the decayed tooth. During treatment, a dentist generally uses a dental band piece and dental burs to remove all the decayed structure from the tooth. After removing the caries, the tooth is left having a cavity. FIG. 2A illustrates an exemplary situation in which the dentist has created cavity C in tooth T. As shown in FIG. 2B, the dentist will then place a dental matrix band B around the tooth T to provide temporary structural support to the cavity C; i.e., forming a temporary wall around the outer boundary of the cavity. As shown in FIGS. 2B and 2C, a tab or flap F is often formed on the dental matrix band B, allowing the dentist to easily grasp and manipulate the dental matrix band B.

As shown in FIG. 2C, the tab or flap F may be folded down, providing the dentist with better access to the cavity C, which is then filled with a dental filling material, such as composite resins, cement, ceramics, or dental amalgams, which is allowed to cure and set, thereby re-establishing the tooth structure. In FIG. 2C, a conventional wedge W is used between teeth to hold the dental matrix band B against the tooth T being filled. As shown, an additional ring R may also be used to provide support for the dental matrix band B and separate the teeth during the procedure.

Typical dental matrix bands, such as dental matrix band B, are formed from a single plate or sheet of a metal or plastic. An example of a typical plastic is light-cured composite resin. Typical examples of metals used in dental matrix bands include aluminum, silver, stainless steel, and combinations and composites thereof. Since these materials are opaque, great difficulty arises when the dental filling material is a photo-curable material, i.e., a photoreactive material which quickly cures under exposure to light. Thus, a light transmissive dental matrix band and a method of using the same solving the aforementioned problems are desired.

SUMMARY

In one embodiment, the present subject matter relates to a light transmissive dental matrix band which can be used in combination with a photoreactive dental filling material. In an embodiment, the light transmissive dental matrix band can include a plate having opposed upper and lower ends, with a vertical slot formed through the plate and extending from the upper end towards the lower end, and with at least one horizontal slot formed through a central portion of the plate and in open communication with the vertical slot. A layer of optically transmissive material can coat the upper end of the plate, and a volume of the optically transmissive material can fill one or more of the vertical slot and the at least one horizontal slot. The volume of the optically transmissive material can be in optical communication with the layer of optically transmissive material coated on the upper end of the plate. A tab, for grasping by the dentist, may be secured to the upper end of the plate.

The plate may be formed from any suitable type of material. In a non-limiting example, the plate is formed from a non-corrosive and non-reactive metal. The optically transmissive material may be formed from any suitable type of optically transmissive material, such as that commonly used in the manufacture of optical fibers (e.g., glass, doped silica glass, transparent plastic, fluoride glass, acrylic, etc.). The plate may be relatively thin (e.g., on the order of about 20 to about 50 μm) and may be provided as a flat but flexible sheet, or as a pre-curved sheet with an arcuate sectional contour for mating against the outer surface of the tooth.

In use, a dentist can remove a decayed structure from a tooth, resulting in a cavity formed in the tooth. The light transmissive dental matrix band can then be placed around the tooth at an outer boundary of the cavity. The cavity can then be filled with a photoreactive dental filling material, which can then be cured by applying light thereto from a conventional hand illuminator or the like. At least a portion of the light can be transmitted through the layer of optically transmissive material coated on the upper end of the plate and the volume of the optically transmissive material, thus transmitting light across the entire outer boundary of the photoreactive dental filling material.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
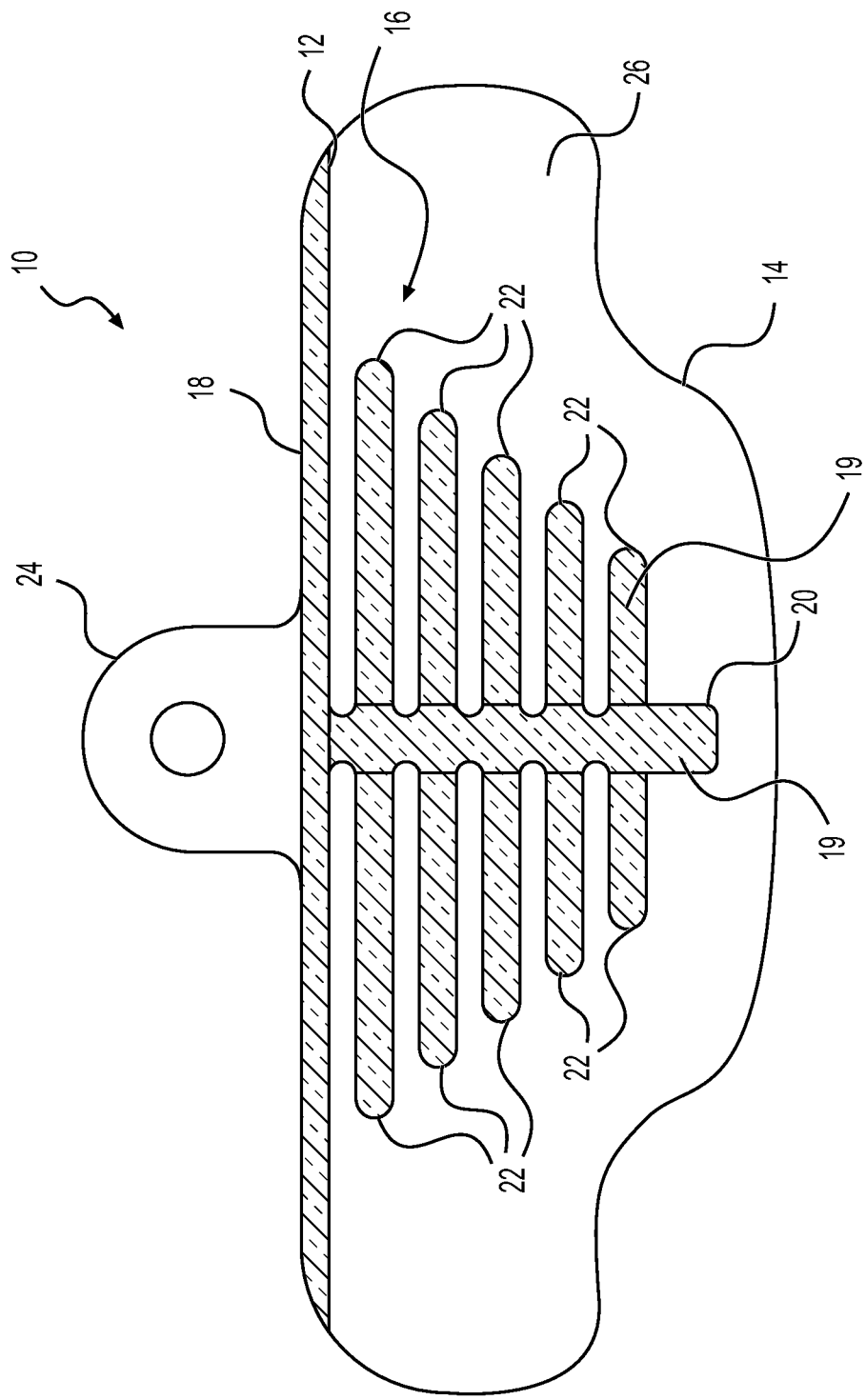
FIG. 1 is a plan view of a light transmissive dental matrix band.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The light transmissive dental matrix band 10 is a dental matrix band for use in combination with a photoreactive dental filling material. As shown in FIG. 1, the light transmissive dental matrix band 10 includes a plate 26 having opposed upper and lower ends 12, 14, respectively, with a vertical slot 20 formed through the plate 26 and extending from the upper end 12 towards the lower end 14. At least one horizontal slot 22 is formed through a central portion 16 of the plate 26 and is in open communication with the vertical slot 20.

In FIG. 1, five such horizontal slots 22 are shown, each being bisected by vertical slot 20. It should be understood that these five horizontal slots 22 are shown for exemplary purposes only, and that any suitable number of horizontal slots may be used, such as one, two, three, four, five, six, or more horizontal slots. It should be further understood that the particular arrangement of horizontal slots 22 with respect to vertical slot 20 is also shown for exemplary purposes only; other arrangements of the horizontal slots are further contemplated herein. Additionally, the use of more than one vertical slot is also contemplated. Since the plate 26 is sized to mate with a typical human tooth, vertical slot 20 and horizontal slots 22 are relatively small. A non-exemplary thickness for each of vertical slot 20 and horizontal slots 22 is on the order of about 50 μm, or from about 45 μm to about 55 μm. It should be further understood that the overall contouring and relative dimensions of plate 26 are shown for exemplary purposes only.

Figure 2A:
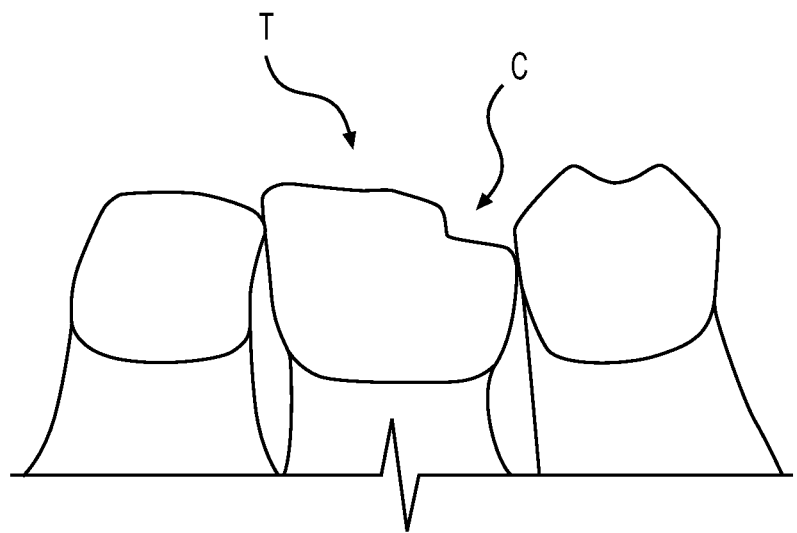
FIG. 2A illustrates a cavity formed in a tooth in a conventional dental procedure to treat tooth decay.
Figure 2B:
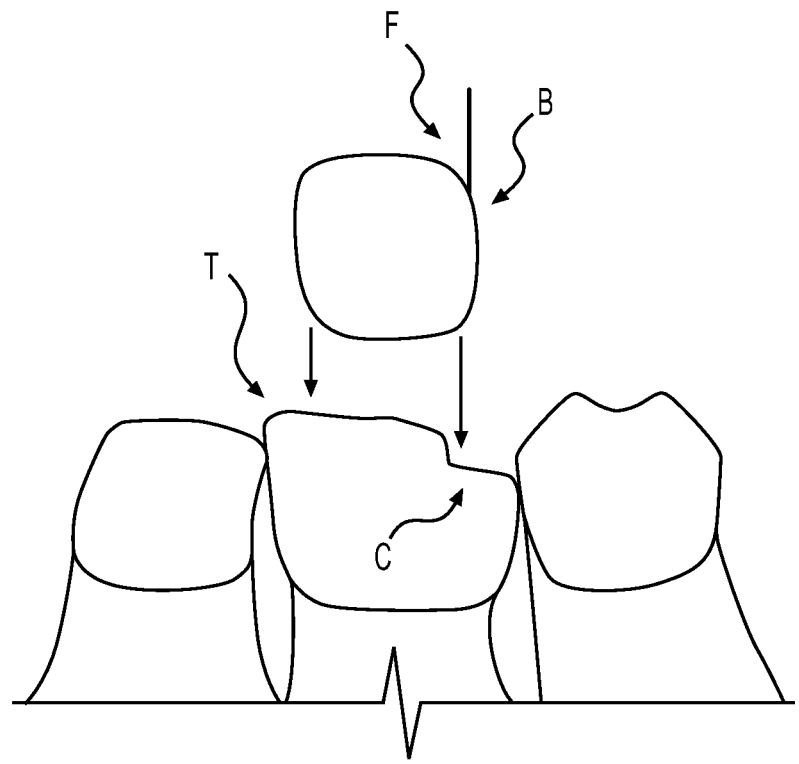
FIG. 2B illustrates application of a conventional prior art dental matrix band to the tooth of FIG. 2A.

A layer of optically transmissive material 18 can coat the upper end 12 of the plate 26, and a volume of the optically transmissive material 19 can fill the vertical slot 20, the at least one horizontal slot 22, or both the vertical slot 20 and the at least one horizontal slot 22. In this regard, where more than one horizontal slot 22 is present, the volume of the optically transmissive material 19 can fill one, some, or all of the horizontal slots 22. The volume of the optically transmissive material 19 is in optical communication with the layer of optically transmissive material 18 coated on the upper end 12 of the plate. As shown in FIG. 1, a tab 24, similar to the tab or flap F of FIGS. 2B and 2C, may be secured to the upper end 12 of the plate 26.

Figure 3:
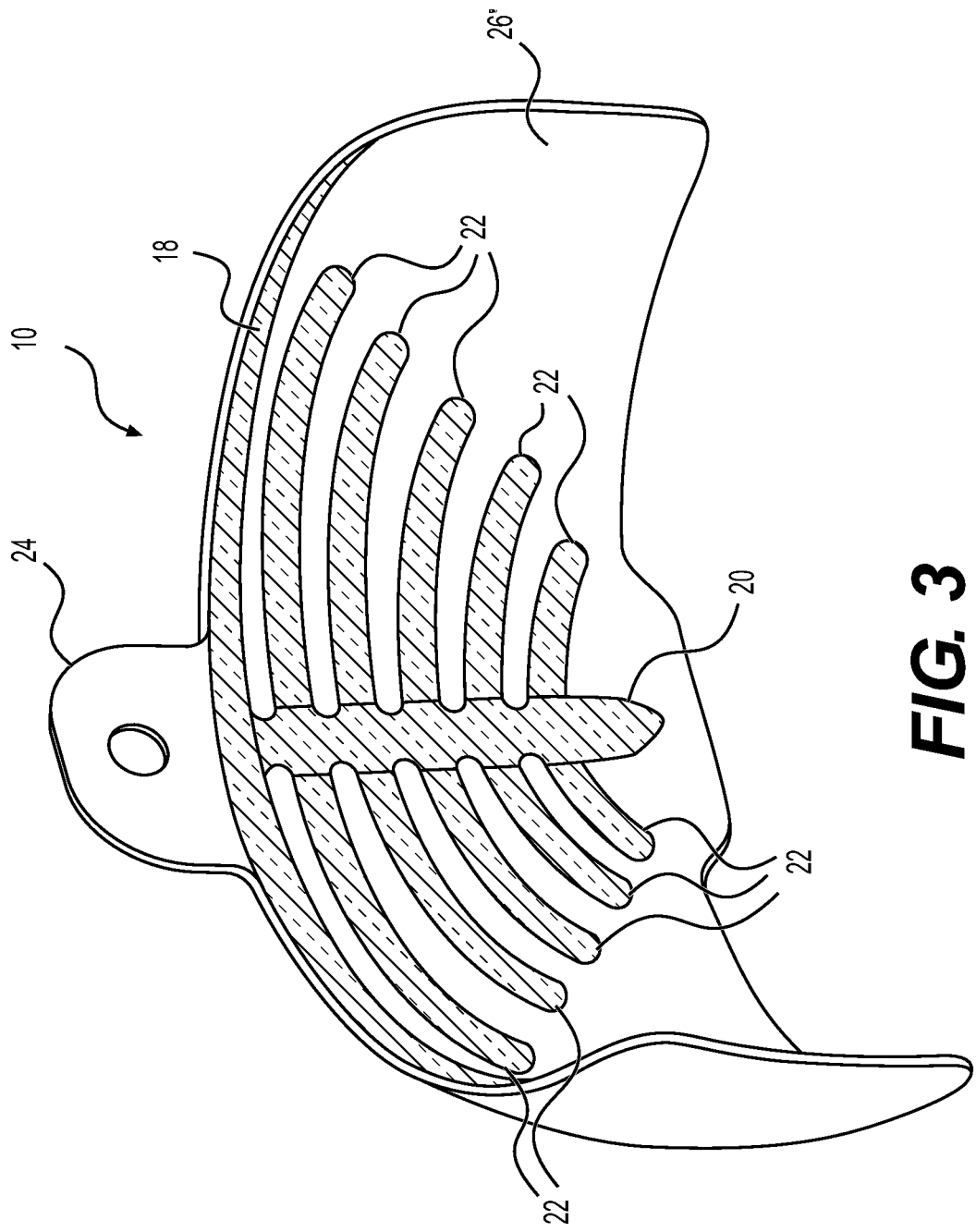
FIG. 3 is a perspective view of an alternative embodiment of the light transmissive dental matrix band of FIG. 1.

The plate 26 may be formed from any suitable type of material. In a non-limiting example, the plate 26 is formed from a non-corrosive and non-reactive metal. The optically transmissive material 18, 19 may be formed from any suitable type of optically transmissive material, such as that commonly used in the manufacture of optical fibers (e.g., glass, doped silica glass, transparent plastic, fluoride glass, acrylic, etc.). Other suitable materials are further contemplated herein. The plate 26 may be relatively thin (e.g., on the order of about 20 μm to about 50 μm) and may be provided as a flat but flexible sheet. In the alternative embodiment of FIG. 3, plate 26 is formed as a pre-curved sheet with an arcuate sectional contour for mating against the outer surface of the tooth.

Figure 2C:
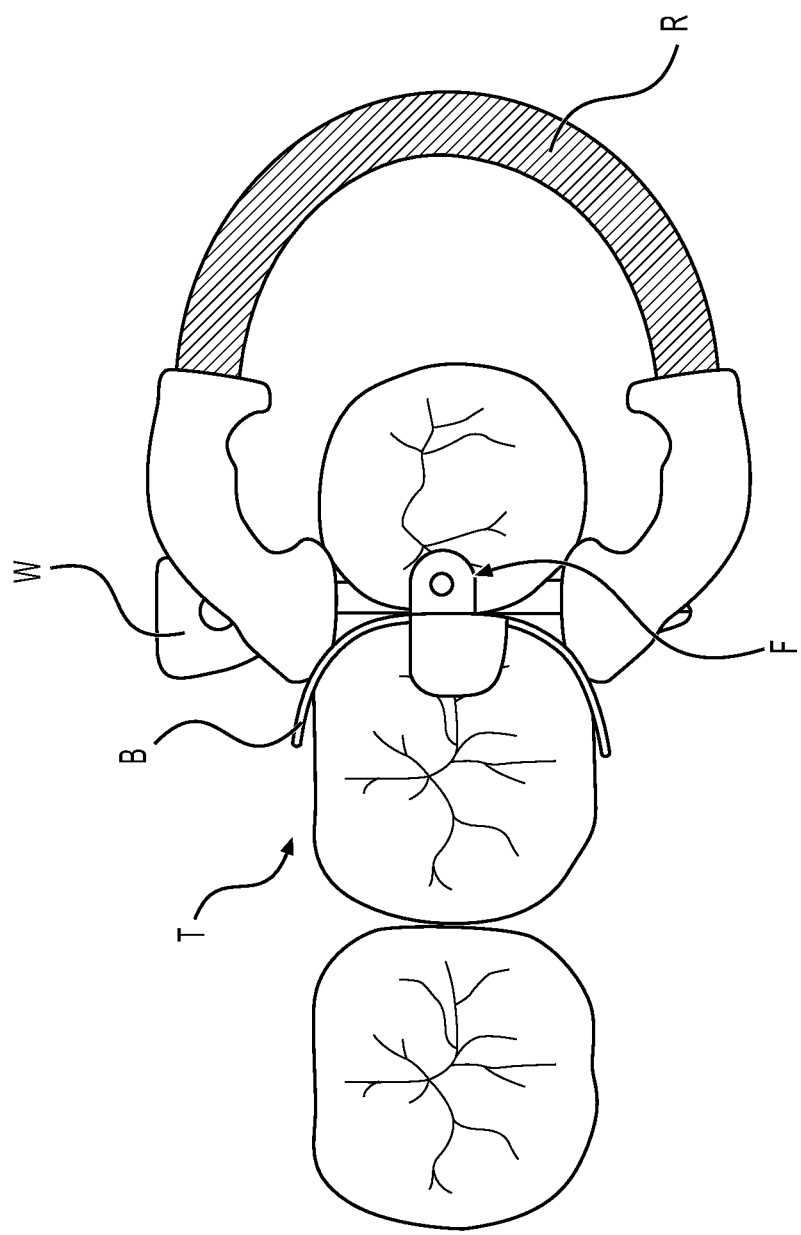
FIG. 2C is a top view illustrating a conventional tooth filling procedure using the conventional prior art dental matrix band of FIG. 2B.
Figure 4:
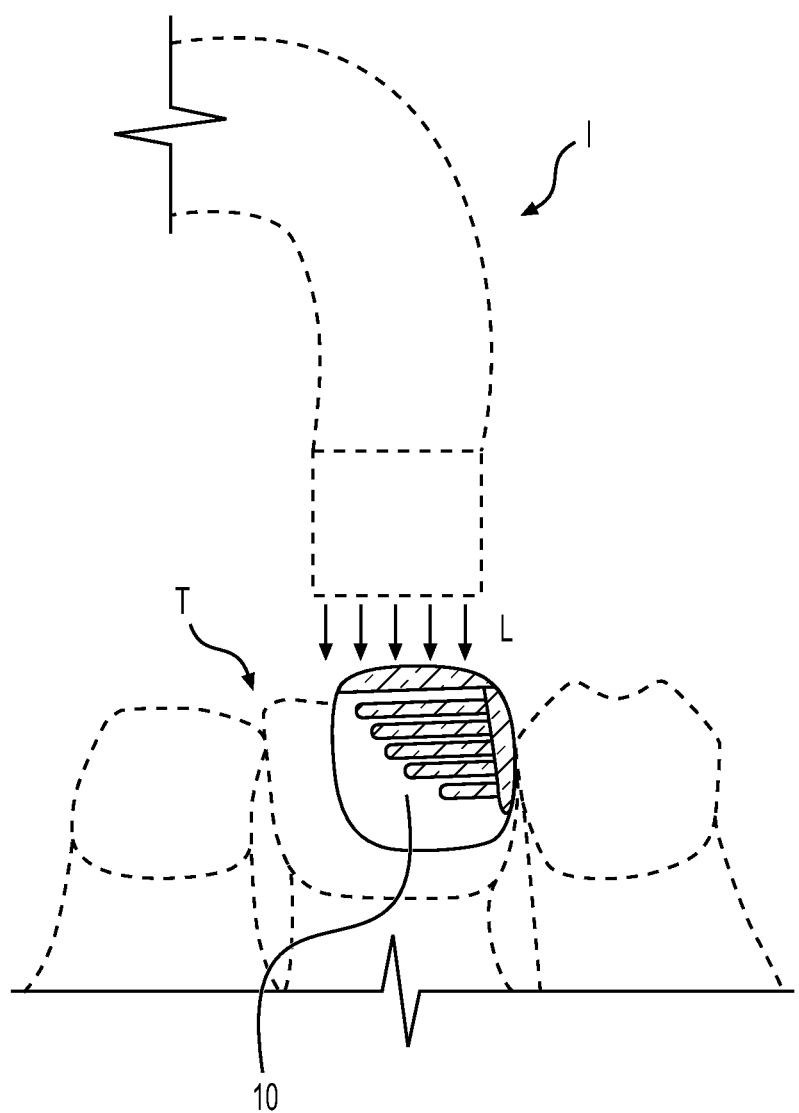
FIG. 4 illustrates curing of a photoreactive dental filling material in a dental procedure to treat tooth decay using the light transmissive dental matrix band.

In use, a dentist can remove a decayed structure from a tooth, resulting in a cavity formed in the tooth, similar to that discussed above with regard to FIGS. 2A-2C. The light transmissive dental matrix band 10 can then be placed around the tooth T at an outer boundary of the cavity. In FIG. 4, the wedge W and ring R of FIG. 2C are not shown for purposes of clarity. The cavity can be filled with a photoreactive dental filling material, which can then be cured by applying light L thereto from a conventional hand illuminator I or the like. At least a portion of the light L can be transmitted through the layer of optically transmissive material 18 coated on the upper end 12 of the plate 26 and the volume of the optically transmissive material 19, thus transmitting light across the entire outer boundary of the photoreactive dental filling material.

It is to be understood that the light transmissive dental matrix band and the method of using the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A light transmissive dental matrix band, comprising:
a plate having opposed upper and lower ends, a vertical slot formed through the plate and extending from the upper end towards the lower end, and at least one horizontal slot formed through a central portion of the plate and in open communication with the vertical slot;
a layer of optically transmissive material coating the upper end of the plate; and
a volume of the optically transmissive material filling both the vertical slot and the at least one horizontal slot, wherein the volume of the optically transmissive material is in optical communication with the layer of optically transmissive material coated on the upper end of the plate, and
wherein the volume of the optically transmissive material filling the vertical slot is in optical communication with the volume of the optically transmissive material filling the at least one horizontal slot.

2. The light transmissive dental matrix band as recited in claim 1, further comprising a tab secured to the upper end of the plate.

3. The light transmissive dental matrix band as recited in claim 1, wherein the plate is formed from metal.

4. The light transmissive dental matrix band as recited in claim 1, wherein the plate is flexible.

5. The light transmissive dental matrix band as recited in claim 1, wherein the plate has an arcuate sectional contour.

6. A method of treating tooth decay using a light transmissive dental matrix band, comprising the steps of:
removing a decayed structure from a tooth, leaving a cavity in the tooth;
placing a light transmissive dental matrix band around the tooth at an outer boundary of the cavity, wherein the light transmissive dental matrix band comprises a plate having opposed upper and lower ends, a vertical slot being formed through the plate and extending from the upper end towards the lower end, and at least one horizontal slot being formed through a central portion of the plate and in open communication with the vertical slot, a layer of optically transmissive material coating the upper end of the plate, and a volume of the optically transmissive material filling both the vertical slot and the at least one horizontal slot, wherein the volume of the optically transmissive material filling the vertical slot is in optical communication with the volume of the optically transmissive material filling the at least one horizontal slot;
filling the cavity with a photoreactive dental filling material; and
curing the photoreactive dental filling material by applying light thereto, at least a portion of the light being transmitted through the layer of optically transmissive material coated on the upper end of the plate and the volume of the optically transmissive material.

\* \* \* \* \*